United States Patent [19]

Cheysson et al.

[11] Patent Number: 4,874,214
[45] Date of Patent: Oct. 17, 1989

[54] CLEAR HOLOGRAPHIC HELMET VISOR AND PROCESS OF PRODUCING SAME

[75] Inventors: Françoise Cheysson, Montrouge; Jean-Blaise Migozzi, Orsay, both of France

[73] Assignee: Thomson-CSF, Paris, France

[21] Appl. No.: 182,448

[22] Filed: Apr. 18, 1988

[30] Foreign Application Priority Data

Apr. 22, 1987 [FR] France ............................... 87 05702

[51] Int. Cl.[4] ............................................. G02B 5/32
[52] U.S. Cl. ..................................... 350/3.7; 350/174
[58] Field of Search ................................. 350/3.7, 174

[56] References Cited

U.S. PATENT DOCUMENTS

| | | | |
|---|---|---|---|
| 3,940,204 | 2/1976 | Withrington | 350/174 |
| 4,218,111 | 8/1980 | Withrington . | |
| 4,245,882 | 1/1981 | Chang . | |
| 4,261,647 | 4/1981 | Ellis . | |
| 4,407,564 | 10/1983 | Ellis . | |
| 4,412,719 | 11/1983 | Fienup . | |
| 4,447,128 | 5/1984 | Ferrer . | |
| 4,456,328 | 6/1984 | Arns et al. . | |
| 4,458,977 | 7/1984 | Arns et al. . | |
| 4,458,978 | 7/1984 | Arns et al. . | |
| 4,497,534 | 2/1985 | Sincerbox . | |
| 4,530,564 | 7/1985 | Close . | |
| 4,582,389 | 4/1986 | Wood et al. . | |
| 4,669,810 | 6/1987 | Wood | 350/3.7 |

FOREIGN PATENT DOCUMENTS

| | | |
|---|---|---|
| 0007039 | 1/1980 | European Pat. Off. . |
| 0216692 | 4/1987 | European Pat. Off. . |
| WO87/01211 | 2/1987 | World Int. Prop. O. . |

OTHER PUBLICATIONS

"Wide Field of View Head-Up Displays", J. R. Banbury, pp. 89-96.
Close, I. H., *Handbook of Optical Holography*, 10.8 "Optically Recorded Holographic Optical Elements", p. 573-585. 1979.
*Optical Engineering*, vol. 14, No. 5, Sept.-Oct. 1975, "Holographic Optical Elements", D. H. Close, pp. 408-419.
SPIE, vol. 215 Recent Advances in Holography (1980, "Computer-Originated Hologram Lenses", R. C. Fairchild, J. R. Fienup, pp. 2-14.
SPIE, vol. 215 Recent Advances in Holograph (1980), "Using a Conventional Optical Design Program to Design Holographic Optical Elements", pp. 15-23, Chungte W. Chen.
*Optical Engineering*, vol. 19, No. 5, Sept.-Oct. 1980, "Dichromated Gelatin Holograms and their Applications", B. J. Chang, pp. 642-648.
Final Technical Report No. AFAL-TR-77-110 May 76-Jan. 77, Radar and Optics Division, Environmentatl Research Institute of Michigan, W. S. Colburn and B. J. Chang, pp. 1-104.
Rev. Sci. Instrum 51 (6) Jun. 1980, 0034-6748/80/0608-09-05S00.60, American Institute of Physics, "Holographic Methods for the Fabrication of Various Types of Mirrors", S. Ananda Rao and S. V. Pappu, pp. 809-813.

(List continued on next page.)

*Primary Examiner*—Bruce Y. Arnold
*Attorney, Agent, or Firm*—Cushman, Darby & Cushman

[57] ABSTRACT

The visor can be readily mounted on a helmet by virtue of the fact that it dispenses with the need for any optical relay system. Provision is made for a light image generator, an optical combining and collimating assembly in which a holographic flat plate and a holographic spherical plate are grouped together so as to provide a view of the collimated image superimposed on the landscape. The holographic spherical plate is employed off the axis and produces collimation in a pupil zone placed substantially at the focal distance of the apex of the spherical mirror. The hologram of the spherical plate is recorded by means of a digital hologram in order to minimize aberrations. The flat plate can be fairly steeply inclined with respect to the sighting axis and so designed as to reduce the ratio of parasitic reflection of the imaging channel.

11 Claims, 2 Drawing Sheets

OTHER PUBLICATIONS

Hughes Aerospace Groups, final Report Aug. 77–June 74, "Laser Eye Protection", July 1979, pp. 1-1-4-6.

Applied Optics, vol. 20, No. 15, Aug. 81, Controlled Shifting of the Spectral Response of Reflection Holograms, Coleman and Magarinos, pp. 2600–2601.

Proceeding National Aerospace and Elecronics Conference, Dayton, Ohio 1981, vol. 3, pp. 1261–1268, R.L. Berry et al., "The Lantirn wide Field-of-View Raster Head-Up Display".

P. Hariharan: "Optical Holography", Edition 2, 13 1986, pp. 146–159, Cambridge University Press, Cambridge, GB; "Computer-Generated Holograms".

CLEAR HOLOGRAPHIC HELMET VISOR AND PROCESS OF PRODUCING SAME

BACKGROUND OF THE INVENTION

The present invention relates to a clear holographic visor which serves to constitute a helmetmounted head-up navigational collimator and process for producing same. By means of this collimator, an aircraft pilot can view an image which is reflected at infinity and superimposed on his vision of the surrounding landscape. Depending on requirements, this light image can consist of navigation data, a sighting reticle or a synthetic image produced by a generator or an associated sensor such as an infrared sensor, for example.

As a general rule, the light image to be collimated is first formed on the screen of a cathode-ray tube or of a liquid crystal matrix, then directed to a first conventional optical system or a so-called optical relay which converts it to an intermediate image. The intermediate image was collimated by means of a partially reflecting optical system which can be composed of a flat plate and a spherical plate utilized on the axis. The two plates are treated in order to produce partial reflection of the rays received from the screen while partially transmitting those which originate from the landscape. This results in loss of information on both channels, namely on the imager channel and on the external landscape viewing channel. Moreover, the treatments employed are such that parasitic images such as, for example, reflections from the rear face of the flat plate, still remain and are liable to hinder the observer. A further drawback is that these collimators have a limited optical field and are too cumbersome to be mounted on a helmet.

In accordance with techniques which offer higher performances, an off-axis arrangement is adopted and the plates are subjected to holographic treatments for obtaining collimation with enhanced photometric efficiency by diffraction as well as improved transmission of the landscape channel. Solutions of this type are described in the article by J. R. Banbury published in the April 1983 issue of "Displays" and entitled "Wide field-of-view head-up displays". Particularly worthy of note in this article is the solution illustrated in FIG. 8C on page 95. This figure shows a head-up structure equipped with a reversing mirror and an optical relay system, the dimensions of which can be made compatible with the equipment by virtue of the fact that the observer's eye is placed at a sufficient distance from the combining and collimating assembly constituted by the flat plate and the spherical plate. In a system of this type, the observation pupil is accordingly placed in proximity to the center of the spherical mirror. The optical relay system serves to form the intermediate image as well as to correct aberrations of the holographic plates. By reason of the exit position of the pupil (at the center of the spherical mirror), this system cannot be perfectly optimized for anti-reflection treatments on the flat plate, with the result that it produces substantial parasitic images. Moreover, the use of an optical relay system is always penalized by the weight and bulk of the visor.

The object of the invention is to overcome these disadvantages by constructing a clear holographic visor of the type aforesaid having a wide field without any optical relay system, which can be mounted on a helmet, and which offers a very good photometric balance with a minimized proportion of parasitic images. Its limited overall size also makes it easier to mount on a helmet or within a cockpit.

SUMMARY OF THE INVENTION

In accordance with the invention, this object is achieved with a clear holographic visor comprising a generator for producing a light image to be collimated, an optical collimating and combining assembly in which are grouped together a flat holographic plate and a spherical holographic plate for providing a view of the collimated image superimposed on the landscape, the radiation of the light image being reflected from the flat plate to the spherical plate which is employed off the axis and the hologram of which produces collimation of the image at infinity. In accordance with the distinctive feature of the invention, the hologram of the spherical plate is determined by means of a computer and recorded by making use of a digital hologram in order to minimize aberrations and to produce for the field of utilization which is contemplated an observation pupil at a distance substantially equal to the focal distance with respect to the apex of the spherical mirror.

DETAILED DESCRIPTION OF THE INVENTION

Figure 1:
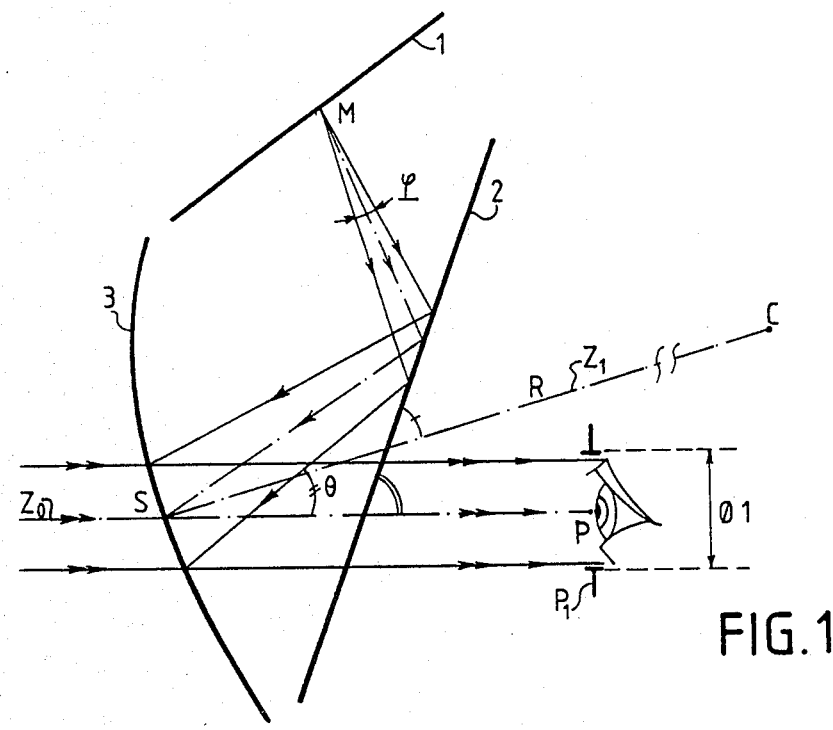
FIG. 1 is a simplified diagram of a clear visor in accordance with the invention.

Reference being made to FIG. 1, the visor is constituted by a light image generator represented in a simplified manner by its screen 1. In the majority of instances, said generator is formed by means of a cathode-ray tube or a liquid crystal matrix and the screen on which is formed the light image to be collimated is usually flat as shown.

The screen 1 is located at the focus of a holographic mirror 3 formed on a spherical support and employed off axis. The light image is reflected to said mirror 3 by means of a flat holographic plate 2 which forms a deviating mirror. As shown in the figure, this collimating assembly is so determined that, starting from each point M of the light image in the case of the field beam shown, there is formed an emergent beam of parallel rays which pass through an observation pupil P1. This pupil is located at a distance SP from the spherical mirror 3 which is substantially equal to its focal distance, that is, to R/2, where R is the radius of curvature of said mirror. The point C represents the center of curvature, the axis Z1 is the central axis of said mirror, the axis Z0 represents the direction of reflection corresponding to the normal direction of vision of the observer and the angle $\theta$ between these two axes represents the angular deviation from the utilization axis. The pupil P1 has a diameter $\phi1$.

Figure 3:
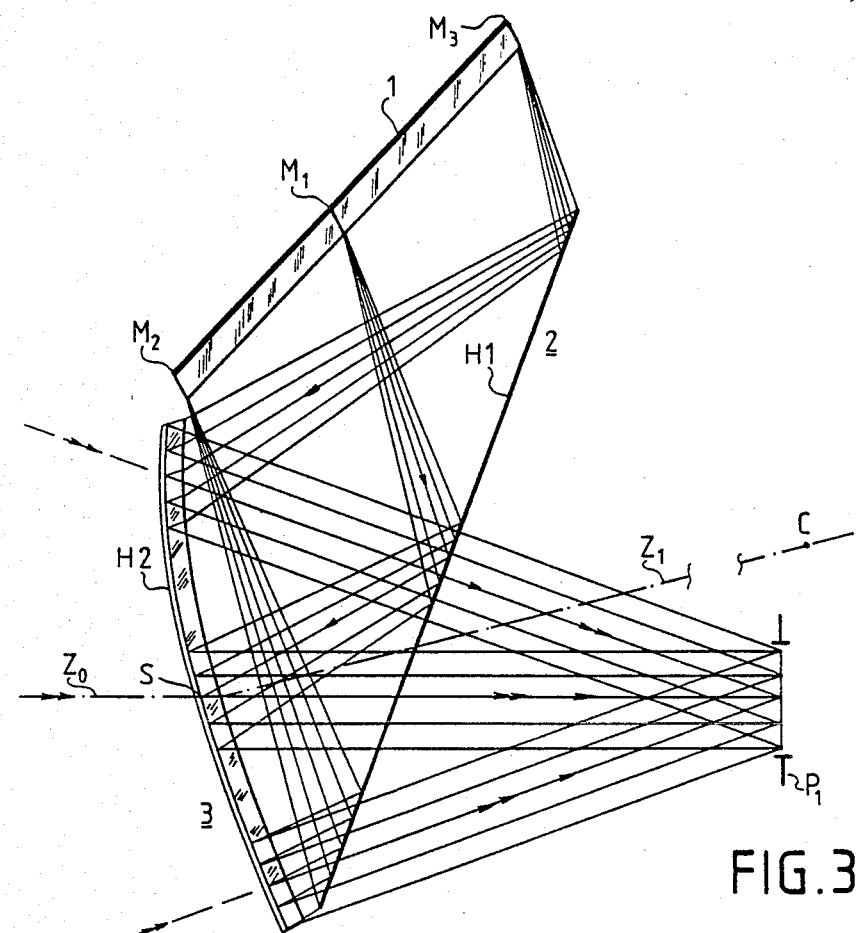
FIG. 3 is a diagram illustrating the optical collimation path.

The optical collimation path is shown in greater detail in FIG. 3 in the case of three points M1, M2, M3 of the light image, M1 being the central point on the axis and M2, M3 being end points. It is apparent that the collimated beams converge in the pupil zone P1. The optical path first involves a reflection from the first hologram H1 carried by the flat plate 2. The radiation is reflected by diffraction toward the spherical mirror 3 at which a second hologram H2 produces collimation, whereupon the collimated rays have an incidence such that they pass through the hologram H1 without being diffracted. The radiation received from the exterior passes successively through the holograms H2 and H1 carried by the plates 3 and 2. The exit pupil P1 represents the zone in which the eye is capable of observing the image. By way of example, the diameter of the pupil can be of the order of 15 millimeters.

Off-axis utilization of the hologram H2 on a spherical support 3 introduces a variation of incidence angles of the rays on the plate 2 before and after reflection from the hologram H2. This makes it possible to employ the first plate 2 with the hologram 1 in such a manner as to produce selective reflection of the light rays as a function of their incidence angle. The flat plate 2 selectively reflects radiation, based on its incidence angle to produce, practically total reflection of the radiation received from the screen 1 and permits practically total transmission of said radiation after reflection from the hologram H2. The off-axis position permits angular separation of the rays to be reflected from those to be transmitted. The flat holographic plate 2 permits a high photometric gain for transmission on the imager channel. This gain is further enhanced by the use of the hologram H2 on the spherical support 3 which also permits achievement of reflection efficiencies of 100% on the imager channel. Generally speaking, the use of the two holograms H1 and H2 makes it possible to obtain a transmission in the vicinity of 100% on the landscape channel throughout the spectrum with the exception of the wavelength (or narrow band) of effective reflection corresponding to the emission band of the imager 1, and also of the order of 100% on the imager channel in the case of the selected wavelength (or narrow wavelength spectrum) corresponding to the radiation emitted by said image generator.

Figures 2, 2A:
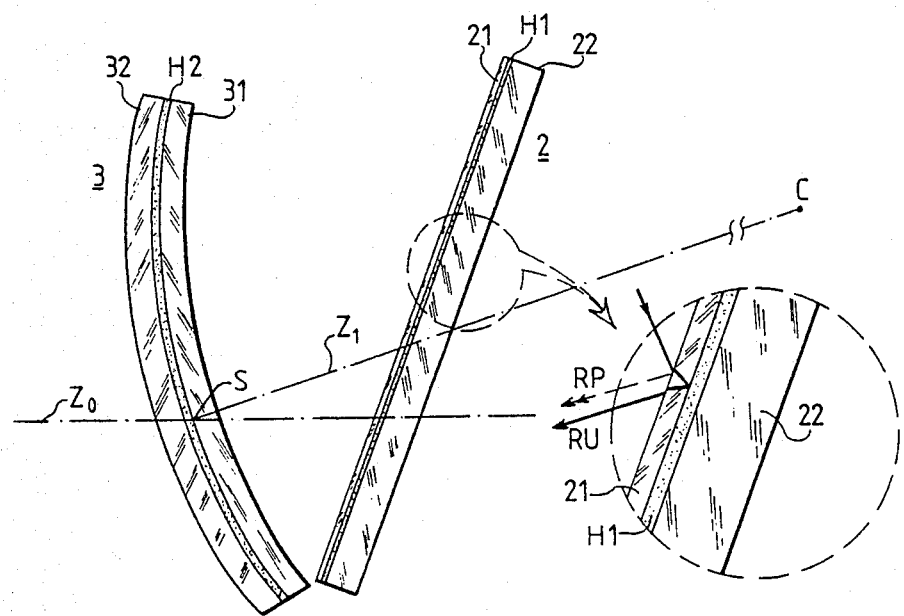
FIG. 2 is a diagram of construction of the optical collimating and combining assembly.
FIG. 2A is a detail diagram of the holographic flat plate of FIG. 2.

FIG. 2 illustrates in greater detail a mode of construction of the optical combining and collimating assembly, that is to say of the elements 2 and 3. Each element is made up of a hologram H1 and H2 respectively which are sandwiched between two transparent plates of glass, for example. The hologram H1 is placed between the flat plates 21 and 22 whilst the hologram H2 is placed between the spherical plates 31 and 32 having the same curvature.

FIG. 2A relates to an enlarged detail of the plate 2 and points up a particular feature of the assembly which permits an increase in photometric gain by reduction of the parasitic image ratio. The plate 22 serves to support the hologram H1 and the plate 21 constitutes a sealing plate. The thickness chosen for the sealing plate is very small and may thus be one-tenth of a millimeter, for example. In consequence, the useful radiation RU diffracted by reflection from the hologram H1 is very close to the parasitic radiation RP reflected from the front face of the sealing plate 21. In the case of a conventional plate which is treated so as to be partially transparent, the useful radiation RU is reflected from the front face and the parasitic radiation RP is produced by reflection from the untreated rear face of the flat plate. This radiation RP is fairly distant from the main reflection RU, the more so as the flat plate is of substantial thickness. Furthermore, if K designates the reflection factor of the treated face, it can be demonstrated that the ratio T of parasitic images is substantially equal to 1.6 K in the case of a treated flat plate and equal to K in the case of the holographic plate 2. There is therefore gained a factor of 1.6 in parasitic light, which is very significant in the case of visors of this type Moreover, since the eye is located substantially in the focal plane of the hologram H2, the angles of incidence of the rays to be reflected from the flat plate must be not very different from each other. In fact, the rays issuing from the imager 1 must arrive collimated on the exit pupil P1. Since this pupil is of small size ($\phi$1) with respect to the overall dimensions of the assembly and is located at the image focal point of the hologram H2, this means that the rays must arrive in practically parallel relation on the hologram H2 and therefore also on the hologram H1 of the plate 2. This makes it possible to provide an anti-reflection treatment of very good quality both on this plate and on the sealing plate 21 of the plate 2. With this anti-reflection treatment resulting from the particular location of the pupil P1, the parasitic image ratio may accordingly be reduced even further.

The use of the curved holographic plate 3 makes it possible to correct aberrations of the system in holographic reflection. In order to obtain this result, there is employed a hologram H2 recorded with two complex waves, at least one of which is produced by means of a digital hologram. This latter is computed beforehand by means of a computer and then integrated on the recording bench The principle of digital holography consists in making use of a mathematical expression with coefficients or parameters which are variable in order to represent the optical formula. As a function of the choice of parameters, the aberrations exhibited by this optical formula are computed. The values of the parameters are then modified, and consecutively the optical formula, so as to reduce the aberrations by wavefront deformations. With the aid of numerical calculations, there is thus progressively obtained an optimized optical formula with minimized or very slight aberrations. These calculations are made while taking into account the total useful field desired for the system and serve in the final analysis to define a holographic optical system 3 which makes it possible to dispense with any image-reforming optical relay system. The digital holography technique employed permits an increase both in field and in resolution while achieving a reduction in overall size.

Another point worthy of note is the advantage of off-axis utilization from an ergonomic standpoint. n fact, the angle of slope of the flat plate 2 with respect to the axis Z0 can be increased and may exceed the value of 45° which is usually adopted in conventional solutions with partially transparent treated plates. The structure proposed is therefore less dangerous and becomes easier to mount on a helmet.

In the case of a potential application which consists in making use of a head-up visor for a helicopter, the angle of slope of the flat plate can be maintained at 45°, thus making it possible, to displace the screen 1 to the rear and to increase the field of the system without bringing the tube (CRT) into contact with the transparent wall of the cockpit.

By way of example of construction, the angles indicated can have the following values :

off-axis angle $\theta$ of the order of 15°;

angle of inclination of the plate 2 to the axis Z0 corresponding to the normal direction of vision : of the order of 70°;

angle between the axis Z1 and the plate 2 : approximately 55°;

radius R : 160 mm ;

field of utilization of the collimated vision : circular field attaining a value of over 40°.

The clear holographic visor hereinabove described accordingly offers many different advantages including high photometric efficiency, low parasitic image ratio, increased field and resolution, smaller bulk owing to suppression of an image-reforming optical system, improved ergonomy by increased inclination of the flat plate.

Figure 4:
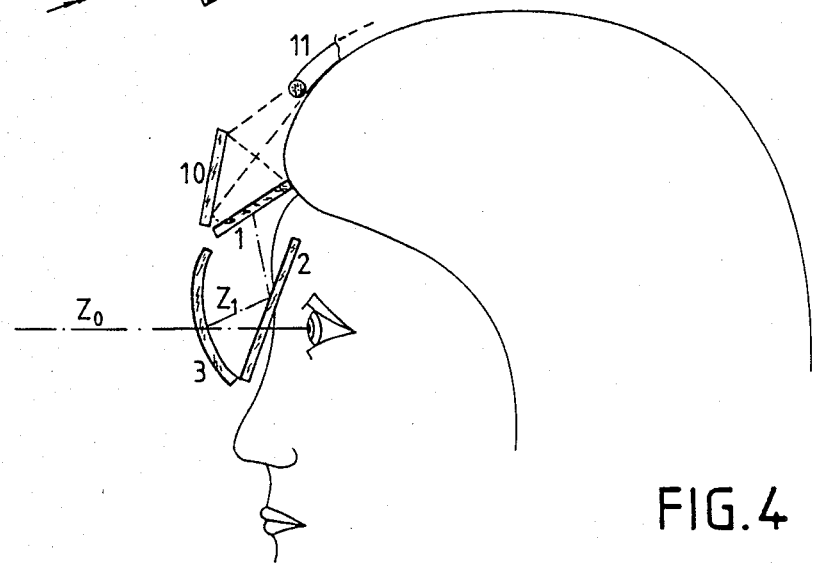
FIG. 4 is a diagram of an application in which the visor is mounted on a helmet.

One example of application is given in FIG. 4 in regard to a helmet-mounted visor involving the use of a liquid-crystal matrix 1 illuminated by means of a light source (not shown in the drawings but either external or carried by the helmet). A bundle of fibers 11 transmits the light radiation from the source to the rear of the matrix after reflection from a reflecting mirror 10.

This assembly can be transposed to a helicopter cabin or cockpit with, if necessary, a steeper inclination of the flat plate 2 in order to facilitate installation of a large-size imager.

What is claimed is:

1. A holographic visor apparatus comprising:
    a generator for producing a light image to be collimated,
    an optical collimating and combining assembly including a flat holographic plate and a spherical holographic plate used off-axis and including a holographic element, for providing a view of a collimated image superimposed on a landscape, radiation of the light image being reflected from the flat plate to the spherical plate which produces a collimation of the image at infinity, wherein the holographic element of the spherical plate is of a type that is determined by means of a computer and recorded by making use of a digital hologram in order to minimize aberrations and to produce for the field of utilization which is contemplated an exit pupil at a distance substantially equal to the focal distance with respect to the spherical mirror.

2. A visor apparatus according to claim 1, wherein the holographic flat plate is made up of a hologram between a support plate and a sealing plate, said sealing plate being of small thickness so that parasitic reflection from the front face of said sealing plate is a physically small distance from the useful radiation diffracted by the hologram to minimize the blur due to the parasitic reflections.

3. A visor according to claim 2, wherein the holographic spherical mirror has a radius of curvature of the order of 160 mm and produces collimation in a zone of the pupil having a diameter of approximately 15 mm.

4. A visor according to claim 3, wherein said field of utilization corresponding to a view of the collimated image is circular and approximately ±20°.

5. A visor according to claim 4, wherein the off-axis angular distance of the spherical mirror is approximately 15°.

6. A visor according to claim 2, wherein the off-axis angular distance of the spherical mirror is approximately 15°.

7. A visor according to claim 1, wherein the spherical mirror is located off-axis at an angular distance of approximately 15°.

8. A holographic visor apparatus comprising:
    a generator for producing a light image to be collimated,
    an optical collimating and combining assembly including a flat holographic plate and a spherical holographic plate used off-axis and including a holographic element, for providing a view of a collimated image superimposed on a landscape, radiation of the light image being reflected from the flat plate to the spherical plate which produces a collimation of the image at infinity, wherein the holographic element of the spherical plate is of a type that is determined by means of a computer and recorded by making use of a digital hologram in order to minimize aberrations and to produce for the field of utilization which is contemplated an exit pupil at a distance substantially equal to the focal distance with respect to the spherical mirror, wherein the holographic spherical mirror has a radius of curvature of the order of 160 millimeters and produes collimation in a pupil zone having a diameter of approximately 15 mm.

9. A visor according to claim 8, wherein said field of utilization corresponding to a view of the collimated image is circular and approximately ±20°.

10. A visor according to claim 9, wherein the off-axis angular distance of the spherical mirror is approximately 15°.

11. A process of producing a holographic visor apparatus that has a generator for producing a light image to be collimated, an optical collimating and combining assembly including a flat holographic plate and a spherical holographic plate used off-axis and including a holographic element portion, for providing a view of a collimated image superimposed on a landscape, radiation of the light image being reflected from the flat plate to the spherical plate which produces a collimation of the image at infinity, said apparatus being formed by a process comprising the steps of:
    determining characteristics of the holographic element of the spherical plate by means of a computer;
    recording the holographic element by making use of a digital hologram in order to minimize aberrations and to produce, for the field of utilization which is contemplated, an exit pupil at a distance substantially equal to the focal distance with respect to the spherical mirror.

* * * * *